Feb. 17, 1942. B. R. ANSLEY 2,273,084
AUTOMATIC CONTROL FOR WIND POWER UNITS
Filed April 25, 1940 2 Sheets-Sheet 1

Inventor
BENJAMIN ROY ANSLEY

By
Attorney

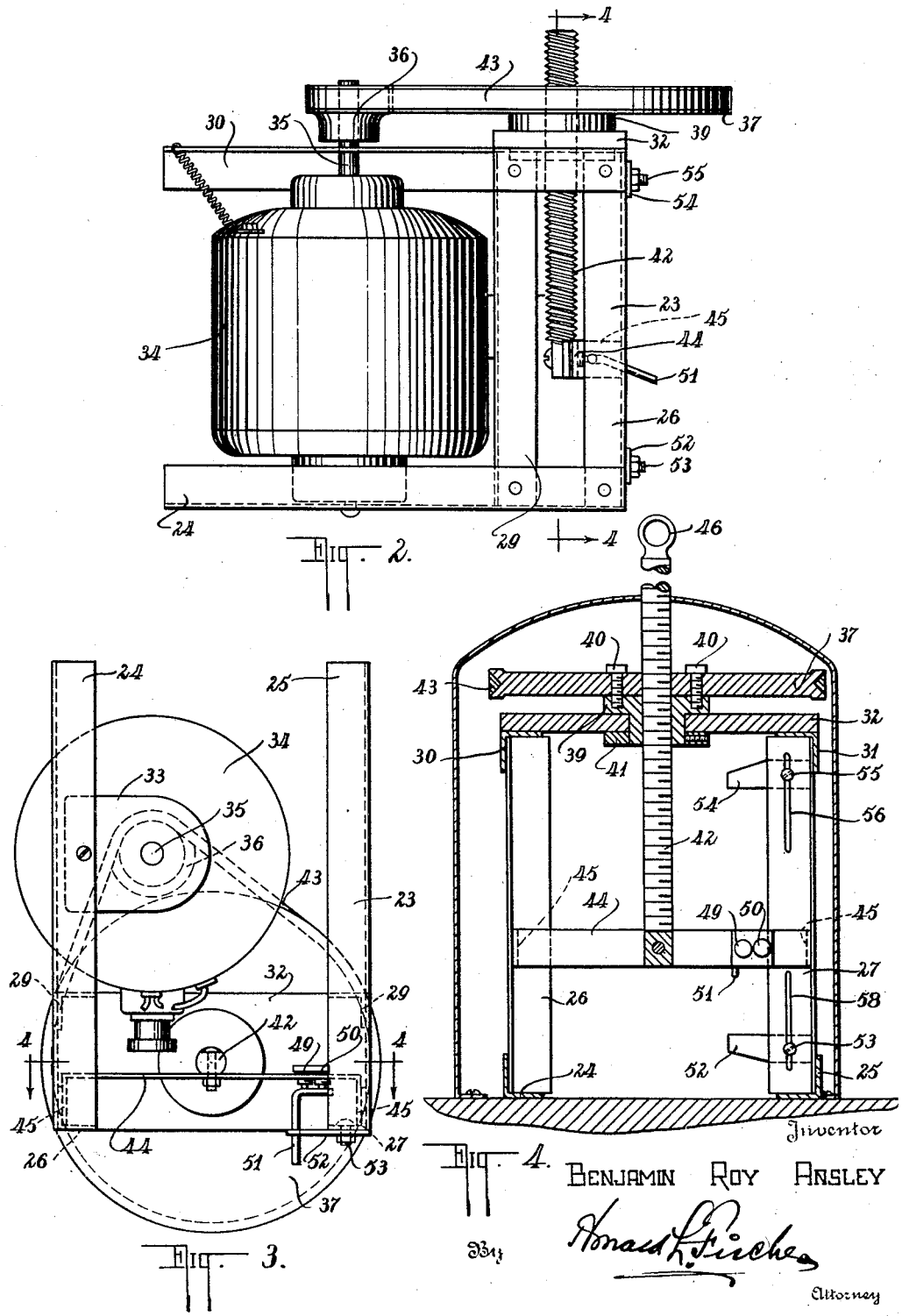

Patented Feb. 17, 1942

2,273,084

UNITED STATES PATENT OFFICE 2,273,084

AUTOMATIC CONTROL FOR WIND POWER UNITS

Benjamin Roy Ansley, Fargo, N. Dak.

Application April 25, 1940, Serial No. 331,540

4 Claims. (Cl. 290—44)

My invention relates to an improvement in automatic control for power generating units wherein it is desired to provide an automatic control preferably actuated by a voltage relay used in conjunction with the storage batteries.

In the past various means have been used to prevent overcharging of the storage batteries connected to wind-driven power units. Most common of these controls has been a circuit closing hydrometer which is actuated by the change in specific gravity of the battery fluid. Other rather complicated mechanisms have been provided for actuating the windpower unit to stop the operation of the same when the batteries become fully charged. Some of these mechanisms employ drums which wind an operating cable to throw the windpower unit out of operation. These former mechanisms have been not only cumbersome, bulky and costly to manufacture, but also have many undesirable features, such as inaccuracy and sensitivity to temperature changes. These former controls vary widely in operation with changes in temperature, and it has been found in some instances that in cold weather the windpower unit has been rendered inoperative while the battery is virtually entirely discharged.

In the past attempts have been made to use watt hour meters to regulate the time of charge and discharge of the batteries. In other words, the battery is permitted to charge for a certain number of hours in which time it is presumed that the battery should become fully charged. This method, however, is not ordinarily fully automatic, nor is it usually accurate.

It is the object of the present invention to obviate the former difficulties experienced with windpower units of the type described by providing a simple mechanical means of controlling the windpower unit accurately. In preferred form, my device embodies a relay actuated by changes in voltage produced by the storage batteries. This relay is actuated when the voltage from the battery drops to a predetermined amount and is actuated again when the voltage raises to a predetermined maximum. As the voltage of the battery is not influenced by changes in temperature, my control will operate properly under variable weather conditions.

It is an object of my invention that my control unit embodies an extremely small number of parts. Not only can this construction be manufactured at a low cost, but also the small number of working parts makes the cost of upkeep on the unit extremely small. Whereas, most of the devices of the prior art have utilized numerous gears, drums and the like, I provide a mechanism in which the operating motor acts upon a single screw-threaded shaft to act directly upon the windpower generating unit.

It is a further feature of the preferred form of my invention that I provide a means of reversing the fields of an electric motor to provide movement in two directions. This reversal of the motor I accomplish in a simple manner by control switches actuated by movement of the power generator unit actuating mechanism. When this mechanism reaches one extremity of its movement, it is automatically placed in condition to reverse the movement. Upon actuation of the voltage controlled relay or by manual operation, if desired, the circuit can be closed to reverse the mechanism to its other extreme position.

It is an important feature of my invention that my automatic voltage regulator prevents the battery from becoming overcharged, and also prevents overcharging and overloading of the battery. My voltage controlled relay operates to place a line load directly upon the generator when the generator is in operation. Furthermore, this relay acts upon a sudden surge of current or overloading of the circuit to start the windpower generator unit regardless of the condition of the battery even though the battery be fully charged. This device never allows the batteries to become undercharged, overcharged, or overloaded, thus cutting down the cost of the batteries and prolonging the life of the batteries used to a considerable extent.

It is a feature of my invention that my wind driven generator control can be operated manually from a remote point if it is so desired. Thus without the use of my voltage regulated relay, the windpower unit may be placed into or out of charging position from a point remote from the generating unit.

It is a feature of my invention that my operating device controlling the generating unit is applicable to the various types of generator units in common use at the present time. Some of these units are stopped by turning the operating propeller out of the wind, certain units are stopped by tilting the entire unit, while others are provided with brakes to hold the propeller stationary. It is an important feature of my invention that my control construction is applicable to any of these various types of generator units.

These and other objects and novel features of my invention will be more clearly and fully set forth in the following specification and claims.

In the drawings forming a part of my specification:

Figure 2 is a side elevational view of the control, removed from its housing.

Figure 3 is a bottom plan view of the control illustrated in Figure 2.

Figure 4 is a sectional view of my control and its housing, the position of the section being indicated by the line 4—4 of Figures 2 and 3.

Figures 1, 5:
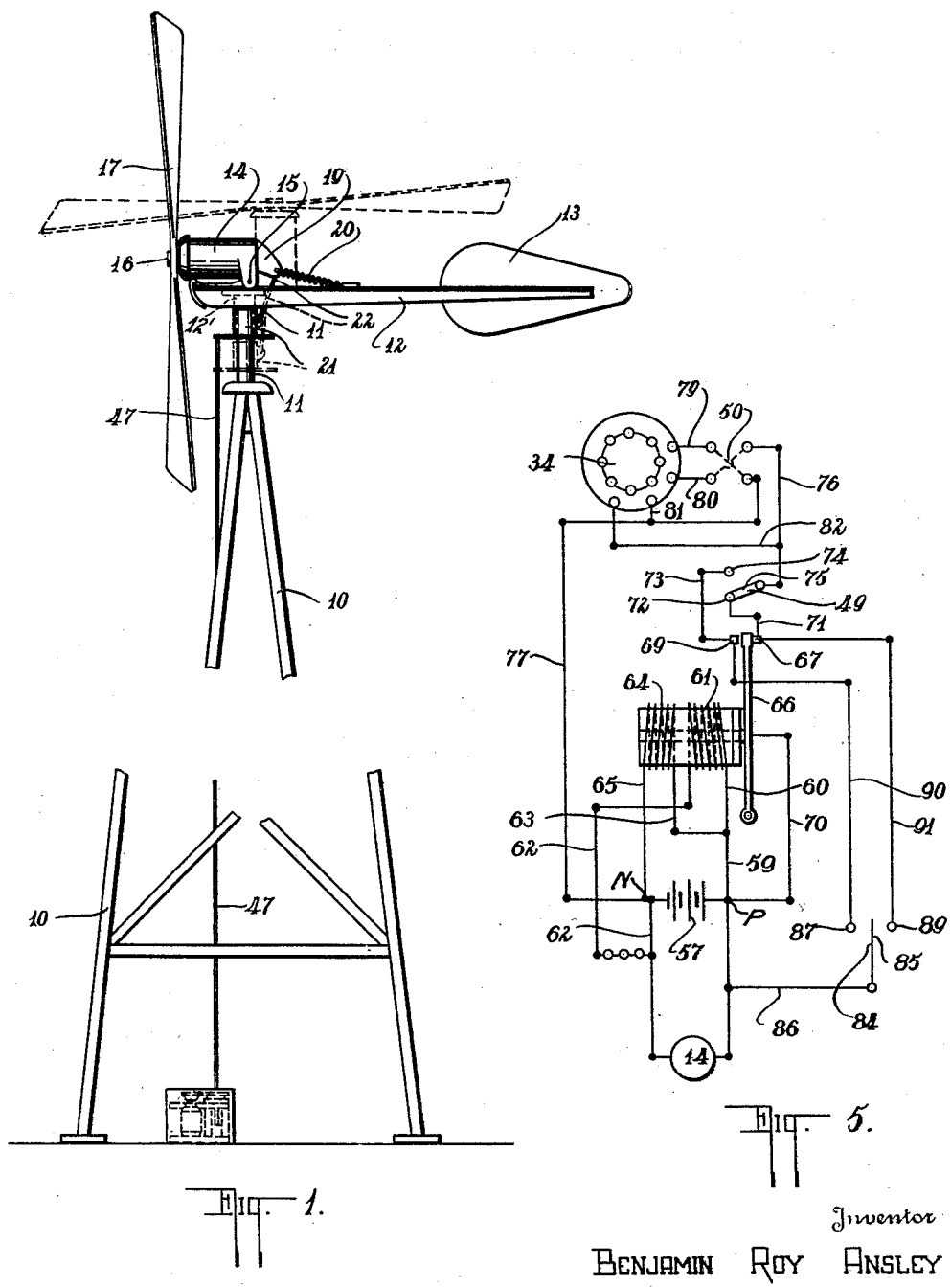
Figure 1 is a side elevational view of a wind power generating unit, showing my new control therefor.
Figure 5 is a wiring diagram of the operating circuits of my control.

The wind power generating device may be of any desired or preferred type. In the drawings I have illustrated a tower 10, having a tubular shaft 11 mounted at the top thereof. A transversely extending wind vane support 12 is secured to a collar 12' on the shaft 11. A wind vane 13 is mounted on the end of the transverse support 12, to hold the support in the direction of the wind.

A generator 14 is pivotally mounted at 15 to the transverse support 12. The armature shaft 16 of the generator 14 is provided with a propeller 17 which is driven by the flow of air striking the same. A bracket 19 extends to the rear of the generator 14. A spring 20 connects the bracket 19 with the transverse support 12, tending to hold the propeller in the operating position shown in full lines in the drawings.

Encircling the tubular shaft 11, I provide a sleeve 21 which is connected by a link 22 with the bracket 19. By sliding the sleeve 21 downwardly upon the shaft 11, the link 22 acts to pull downwardly upon the bracket 19, tilting the generator 14 until its axis is substantially vertical. In this position, shown in dotted outline in Figure 1, the propeller lies upon a substantially horizontal plane, and will not rotate in the wind.

In Figures 2, 3 and 4 of the drawings, I illustrate a means for tilting the generator 14. While the specific form of construction illustrated is believed of considerable merit, it is wished to point out that this is illustrative of one of several forms of construction which could be used to accomplish my result. It is also desired to emphasize that any suitable form of wind power generating unit may be used, as most of these units are operated by a reciprocable movement of an operating cable, rope, or rod.

A frame, illustrated in general by the numeral 23, is formed with a pair of transverse horizontal angle iron members 24 and 25 forming a base. Extending upwardly from one end of each of the base angles 24 and 25, I provide an angle corner member 26 and 27, respectively. Spaced from the vertical corner members 26 and 27 and parallel thereto, I provide vertical braces 29.

Angle irons 30 and 31 are secured to the upper extremities of the angle corner members 26 and 27. These angle irons 30 and 31 extend horizontally parallel to the base angles 24 and 25, and are braced by the vertical braces 29. Extending between the angle irons 30 and 31 and connecting the same, I provide a cross plate 32.

A bracket 33 extends horizontally from the base angle 24 and forms a support for the motor 34. The motor 34 is mounted with its armature shaft 35 in a generally vertical direction, as illustrated. A pulley 36 is mounted on the shaft 35 for rotation therewith.

A pulley 37 is provided with a threaded sleeve 39 attached concentrically thereto by any suitable means such as the bolts 40. A collar 41 on the lower end of the sleeve 39 holds the sleeve extending through the plate 32. The plate 32 is suitably drilled to accommodate the sleeve extending therethrough, and the collar 41 is positioned below the plate 32 to prevent axial movement of the sleeve, and to permit free rotary movement.

A shaft 42 extends through the sleeve 39 and threadably engages the same. Rotation of the pulley 37 causes reciprocation of the shaft 42 if the shaft is prevented from rotation. A belt 43 connects the pulley 37 with the pulley 36 to cause rotation of both pulleys when the motor 34 is in operation.

A crosshead 44 extends between the corner angles 30 and 31; and flanged ends 45 thereon slidably engage these angles 30 and 31. By this means the shaft 42 is held from rotation, so that rotation of the motor 34 causes reciprocation of the shaft 42. Reciprocation in both an upward and a downward movement can be effected, as the motor 34 is of a reversible type. The manner in which the reciprocation takes place will be later more fully described.

An eye or ring 46 is provided on the upper end of the screw threaded shaft 42. This eye 46 is connected with the sleeve 21 on the vertical shaft 11. Thus, by operating the motor 34 in one direction, the shaft 42 will be lowered to pull downwardly upon the rod or cable 47 connecting the eye 46 with the sleeve 21, pivoting the generator 14 upwardly until its axis is substantially vertical. In this position the wind will not rotate the propeller, and the generation ceases. By operating the motor 34 in the opposite direction, the cable or rod 47 is released, allowing the spring 20 to pull the generator 14 into operative position. The weight of the generator assists this action.

A pair of toggle switches 49 and 50 are mounted on the crosshead 44, and are provided with a common operating lever 51. This lever 51 strikes a stop lug 52 adjustably mounted by the bolt 53 in the vertical slot 53 in the corner member 27. This stop lug 51 pivots the switch lever 51 and operates the switches 49 and 50. As the crosshead 44 moves upwardly, the lever 51 strikes the lug 54 secured by the bolt 55 in the slot 56, pivoting the lever 51 in the opposite direction.

With reference now to the wiring diagram, Figure 5, it will be noted that the generator 14 generates power to charge the battery or batteries 57. Concentric relay coils are connected to opposite poles of the battery 57. From the battery pole P, the conductors 59 and 60 lead to one terminal of the relay coil 61. The other terminal of the coil 61 is connected by the conductor 62 to the battery terminal N, completing the circuit.

From the battery pole P, the conductors 59 and 63 are connected with one terminal of the relay coil 64, the other terminal thereof being connected by conductor 65 to the battery terminal N, completing the circuit.

A rise in voltage of the battery 57 to a predetermined maximum, causes the relay coils to operate the relay armature 66 to contact the terminal 69. A drop in voltage in the battery to a predetermined minimum causes movement of the armature 66 to contact the terminal 67. The armature 66 is connected by the conductor 70 to the battery pole P. The terminal 67 is connected by conductor 71 with one contact 72 of the switch 49. The terminal 69 is connected by conductor 73 to the contact 74 of the switch 49. The switch blade 74 of the switch 49 is permanently connected to conductor 76 leading to the reversing switch 50. The other terminal of the reversing switch 50 is connected by conductor 77 to the battery pole N.

The reversing switch is connected by conductors 79 and 80 to the field coils of the motor 34. When the switch 50 is operated, the direction of rotation of the motor 34 changes. One of the motor terminals is connected by conductor 81 with the conductor 77 leading to battery pole N. The other motor lead is connected by conductor 82 to the conductor 76.

In operation, when the battery 57 becomes sufficiently charged by the generator 14, the armature 66 is moved into contact with the terminal 69, closing a circuit from battery terminal P through conductor 70, armature 66, conductor 73, conductor 76, reversing switch 50, to the field of the motor 34. The motor terminal is connected by conductor 82. The other field terminal is connected through conductors 79, switch 50, and conductor 77 to the battery terminal N. The other motor terminal is connected in the circuit by the conductor 81.

The motor 34 starts to operate, and moves the shaft 42 downwardly until the switch lever 51 strikes lug 52. The switch 49 is actuated, its blade 75 moving into contact with the contact 74. This stops the motor 34, as the circuit is open between the armature 66 and the contact 67. Simultaneously the reversing switch 50 is operated so that when the motor circuit is next closed, the motor 34 will operate in a direction to raise the shaft 42.

When the batteries become discharged sufficiently, the relay coils move the armature 66 into contact with the terminal 67. This closes a circuit from terminal P through conductor 70, armature 66, terminal 67, conductor 71, blade 75 of switch 49, conductor 76, switch 50, conductor 80, to one motor field terminal. The other field terminal is connected through conductor 79, reversing switch 50, and conductor 77 to battery terminal N. The motor terminals are also energized through conductors 81 and 82. The motor 34 operates, raising the shaft 42 until the toggle switch handle 51 engages the lug 54, moving switch blade 75 into contact with terminal 72. This breaks the motor circuit, as the armature 66 is disengaged from terminal 69; and also it reverses the position of switch 50, so that when the motor circuit is again energized, the motor will rotate in a direction to lower the shaft 42.

If it is desired, a switch 84 may be provided in order to control the motor 34 manually. The blade 85 of the switch 84 is connected by conductor 86 to the battery terminal P. The contacts 87 and 89 are connected by conductors 90 and 91, respectively, to the conductors 69 and 67. The switches 49 and 50 still act to stop the motor and to reverse the field, respectively, by actuation of the switch blade 85 alternately into contact with contacts 87 and 89. When the switch 84 is in one position, the motor 34 will raise the shaft 42; and in the other position, the motor will lower the shaft 42.

The relay coils 61 and 64 are actuated not only by a lowering in the charge of the battery, but in case of a heavy drain on the battery which also tends to lower the battery voltage. When a heavy drain is placed upon the batteries, the relay acts to start the generator 14, even though the battery may be quite well charged at the time. This places the load upon the generator, rather than upon the battery, preventing a quick drain of the battery.

In accordance with the patent statutes, I have described the principles of construction of my wind plant battery control; and while I have endeavored to set forth the best embodiment thereof, I desire to have it understood that this is only illustrative of a means of carrying out my invention, and that obvious changes may be made within the scope of the following claims without departing from the spirit of my invention.

I claim:

1. In combination with a generator actuated by a wind wheel and a battery charged by the generator, a rod supported for vertical movement, means connected with the upper end of the rod for stopping the generator when the rod is moved downwardly and for starting the generator when the rod moves upwardly, a reversible motor, switch means for controlling the circuit to the fields thereof, second switch means for controlling the circuit to the motor, means actuated by the motor for moving said rod vertically and means carried by the rod for actuating both switch means.

2. In combination with a generator actuated by a wind wheel and a battery charged by the generator, a rod supported for vertical movement, means connected with the upper end of the rod for stopping the generator when the rod is moved downwardly and for starting the generator when the rod moves upwardly, a reversible motor, switch means for controlling the circuit to the fields thereof, second switch means for controlling the circuit to the motor, means actuated by the motor for moving said rod vertically and means carried by the rod for actuating both switch means, said switch control means including upper and lower projections on the rod and a single switch lever actuated by said projections for simultaneously operating both switch means.

3. In combination with a generator actuated by a wind wheel and a battery charged by the generator, a rod supported for vertical movement, means connected with the upper end of the rod for stopping the generator when the rod is moved downwardly and for starting the generator when the rod moves upwardly, a reversible motor, switch means for controlling the circuit to the fields thereof, second switch means for controlling the circuit to the motor, means actuated by the motor for moving said rod vertically and means carried by the rod for actuating both switch means, said motor operating means including a reciprocable shaft, and means connecting the motor and shaft for moving the same.

4. In combination with a generator actuated by a wind wheel and a battery charged by the generator, a rod supported for vertical movement, means connected with the upper end of the rod for stopping the generator when the rod is moved downwardly and for starting the generator when the rod moves upwardly, a reversible motor, switch means for controlling the circuit to the fields thereof, second switch means for controlling the circuit to the motor, means actuated by the motor for moving said rod vertically and means carried by the rod for actuating both switch means, said motor operating means including a rotary member having a threaded hole therein and the vertically movable rod having a screw-threaded part passing through the threaded hole and means for rotating said rotary member from the motor.

BENJAMIN ROY ANSLEY.